United States Patent
Crawford et al.

(10) Patent No.: US 9,639,290 B2
(45) Date of Patent: *May 2, 2017

(54) SUBSTITUTION OF A TARGET VOLUME OF A SECONDARY STORAGE CONTROLLER FOR A SOURCE VOLUME OF A PRIMARY STORAGE CONTROLLER FOR EXECUTING A WRITE OPERATION

(71) Applicant: International Business Machines Corporation, Armonk, NY (US)

(72) Inventors: Joshua J. Crawford, Tucson, AZ (US); Benjamin J. Donie, Chandler, AZ (US); Andreas B. Koster, Vail, AZ (US); Leann A. Vaterlaus, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/188,868

(22) Filed: Jun. 21, 2016

(65) Prior Publication Data

US 2016/0299717 A1 Oct. 13, 2016

Related U.S. Application Data

(63) Continuation of application No. 14/951,053, filed on Nov. 24, 2015, now Pat. No. 9,423,975, which is a continuation of application No. 13/476,659, filed on May 21, 2012, now Pat. No. 9,235,483, which is a continuation of application No. 12/965,648, filed on Dec. 10, 2010, now Pat. No. 9,244,786.

(51) Int. Cl.
*G06F 12/00* (2006.01)
*G06F 3/06* (2006.01)
*G06F 11/20* (2006.01)

(52) U.S. Cl.
CPC ............ *G06F 3/0619* (2013.01); *G06F 3/065* (2013.01); *G06F 3/067* (2013.01); *G06F 3/0659* (2013.01);
(Continued)

(58) Field of Classification Search
CPC ............. G06F 11/2069; G06F 11/2082; G06F 11/2076
(Continued)

(56) References Cited

U.S. PATENT DOCUMENTS 6,442,709 B1    8/2002  Beal et al.
7,111,189 B1    9/2006  Sicola et al.
(Continued)

OTHER PUBLICATIONS

A.C. Azagury, et al., "Advanced Functions for Storage Subsystem: Supporting Continuous Availability", IBM Corporation, IBM Systems Journal vol. 42, No. 2, 2003, pp. 268-279.
(Continued)

*Primary Examiner* — Matthew Bradley
(74) *Attorney, Agent, or Firm* — Rabindranath Dutta; Konrad Raynes Davda & Victor LLP.

(57) ABSTRACT

A secondary storage controller receives metadata that uniquely identifies a source volume of a primary storage controller. Data stored in the source volume of the primary storage controller is synchronously copied to a target volume of the secondary storage controller. The secondary storage controller receives a command from a primary host to write selected data to the source volume. In response to receiving the command at the secondary storage controller, the selected data is written to the target volume of the secondary storage controller.

15 Claims, 5 Drawing Sheets

(52) U.S. Cl.
CPC .......... *G06F 3/0665* (2013.01); *G06F 3/0689* (2013.01); *G06F 11/2069* (2013.01); *G06F 11/2076* (2013.01); *G06F 11/2082* (2013.01)

(58) Field of Classification Search
USPC ........................................................ 711/161
See application file for complete search history.

(56) References Cited

U.S. PATENT DOCUMENTS

| | | |
|---|---|---|
| 7,269,701 B2 | 9/2007 | Shakelford et al. |
| 7,404,051 B2 | 7/2008 | Shitomi |
| 7,603,581 B2 | 10/2009 | Boyd et al. |
| 9,235,483 B2 | 1/2016 | Crawford et al. |
| 9,244,786 B2 | 1/2016 | Crawford et al. |
| 2006/0143413 A1 | 6/2006 | Agombar |
| 2008/0005146 A1 | 1/2008 | Kubo et al. |
| 2009/0043979 A1 | 2/2009 | Jarvis |
| 2012/0151135 A1 | 6/2012 | Crawford et al. |
| 2012/0233423 A1 | 9/2012 | Crawford et al. |
| 2016/0077742 A1 | 3/2016 | Crawford et al. |

OTHER PUBLICATIONS

J. Glorieux, "2 Site and 3 Site Enterprise Disk Mirroring", IBM Corporation, IBM Systems, Sep. 20, 2006, pp. 1-71.
Preliminary Amendment filed May 21, 2012, pp. 1-5, for U.S. Appl. No. 12/965,648, filed Dec. 10, 2010.
Office Action dated Apr. 28, 2014, pp. 11, for U.S. Appl. No. 12/965,648, filed Dec. 10, 2010.
Response dated Jul. 28, 2014, p. 7, to Office Action dated Apr. 28, 2014, pp. 11, for U.S. Appl. No. 12/965,648, filed Dec. 10, 2010.
Office Action dated Jun. 17, 2015, pp. 12, for U.S. Appl. No. 12/965,648, filed Dec. 10, 2010.
Response dated Jul. 30, 2015, pp. 7, to Office Action dated Jun. 17, 2015, pp. 12, for U.S. Appl. No. 12/965,648, filed Dec. 10, 2010.
Notice of Allowance dated Aug. 28, 2015, pp. 13, for U.S. Appl. No. 12/965,648, filed Dec. 10, 2010.
Preliminary Amendment filed May 21, 2012, pp. 1-7, for U.S. Appl. No. 13/476,659, filed May 21, 2012.
Office Action dated Mar. 20, 2014, pp. 9, for U.S. Appl. No. 13/476,659, filed May 21, 2012.
Response dated Jun. 20, 2014, pp. 6, to Office Action dated Mar. 20, 2014, pp. 9, for U.S. Appl. No. 13/476,659, filed May 21, 2012.
Office Action dated Mar. 27, 2015, pp. 7, for U.S. Appl. No. 13/476,659, filed May 21, 2012.
Response filed Jun. 29, 2015, pp. 7, to Office Action dated Mar. 27, 2015, pp. 7, for U.S. Appl. No. 13/476,659, filed May 21, 2012.
Notice of Allowance dated Aug. 28, 2015, pp. 11, for U.S. Appl. No. 13/476,659, filed May 21, 2012.
Office Action dated Jan. 21, 2016, pp. 14, for U.S. Appl. No. 14/951,053, filed Nov. 24, 2015.
Response dated Apr. 21, 2016, pp. 3, to Office Action dated Jan. 21, 2016, pp. 14, for U.S. Appl. No. 14/951,053, filed Nov. 24, 2015.
Notice of Allowance dated May 10, 2016, pp. 5, for U.S. Appl. No. 14/951,053, filed Nov. 24, 2015.

SUBSTITUTION OF A TARGET VOLUME OF A SECONDARY STORAGE CONTROLLER FOR A SOURCE VOLUME OF A PRIMARY STORAGE CONTROLLER FOR EXECUTING A WRITE OPERATION

CROSS-REFERENCE TO RELATED APPLICATIONS

This application is a continuation of U.S. patent application Ser. No. 14/951,053 filed Nov. 24, 2015, wherein U.S. patent application Ser. No. 14/951,053 is a continuation of U.S. patent application Ser. No. 13/476,659 filed May 21, 2012, wherein U.S. patent application Ser. No. 13/476,659 is a continuation of U.S. patent application Ser. No. 12/965,648 filed Dec. 10, 2010, and wherein U.S. patent application Ser. No. 14/951,053, U.S. patent application Ser. No. 13/476,659, and U.S. patent application Ser. No. 12/965,648 are incorporated herein by reference in their entirety.

BACKGROUND

1. Field

The disclosure relates to a method, a system, and a computer program product for the substitution of a target volume of a secondary storage controller for a source volume of a primary storage controller for executing a write operation.

2. Background

Peer to peer remote copy is a type of copy operation in which source storage volumes of a primary storage controller are synchronously copied to target storage volumes of a secondary storage controller. One or more hosts may be coupled to the primary and secondary storage controllers. Furthermore, the same host may be coupled to both the primary storage controller and the secondary storage controller.

The peer to peer remote copy operation may via additional mechanisms maintain the source storage volumes and target storage volumes in a consistent state with respect to each other. In the event of a failure of the primary storage controller, the secondary storage controller may substitute the primary storage controller.

SUMMARY OF THE PREFERRED EMBODIMENTS

Provided are a method, a system, and a computer program product in which a secondary storage controller receives metadata that uniquely identifies a source volume of a primary storage controller. Data stored in the source volume of the primary storage controller is synchronously copied to a target volume of the secondary storage controller. The secondary storage controller receives a command from a primary host to write selected data to the source volume. In response to receiving the command at the secondary storage controller, the selected data is written to the target volume of the secondary storage controller.

In further embodiments, the metadata is a Small Computer Systems interface (SCSI) logical unit (LUN) identifier (ID) that uniquely identifies the source volume of the primary storage controller. The copied data is consistent between the source volume and the target volume. An emulator that executes in the secondary storage controller uses the SCSI LUN ID that uniquely identifies the source volume to map the received command to write the selected data to the source volume, to instead write the selected data to the target volume of the secondary storage controller.

In yet further embodiments, the target volume of the secondary storage controller is synchronized to the source volume of the primary storage controller, subsequent to writing the selected data to the target volume.

In additional embodiments, the primary host is coupled to the primary storage controller and a path exists from the primary host to the secondary storage controller. In response to the primary storage controller failing or being overloaded, the primary host sends the command to write the selected data to the source volume, to the secondary storage controller.

In yet additional embodiments, the primary host receives an indication from the secondary storage controller that the command to write the selected data to the source volume has been executed, even though the selected data has been written to the target volume.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow a host to perform read and write operations to both the source and the target volumes once consistency has been established, where the source volume is found in the primary storage controller and the target volume is found in the secondary storage controller. The secondary storage controller may emulate the primary storage controller's logical unit (LUN) characteristics to make the target volume of the secondary storage controller appear to be another path to the source volume of the primary storage controller. As a result, if a write operation directed to a source volume is received from a host by the secondary storage controller, the write operation to the source volume may be substituted by an equivalent write operation to the target volume of the secondary storage controller.

EXEMPLARY EMBODIMENTS

Figure 1:
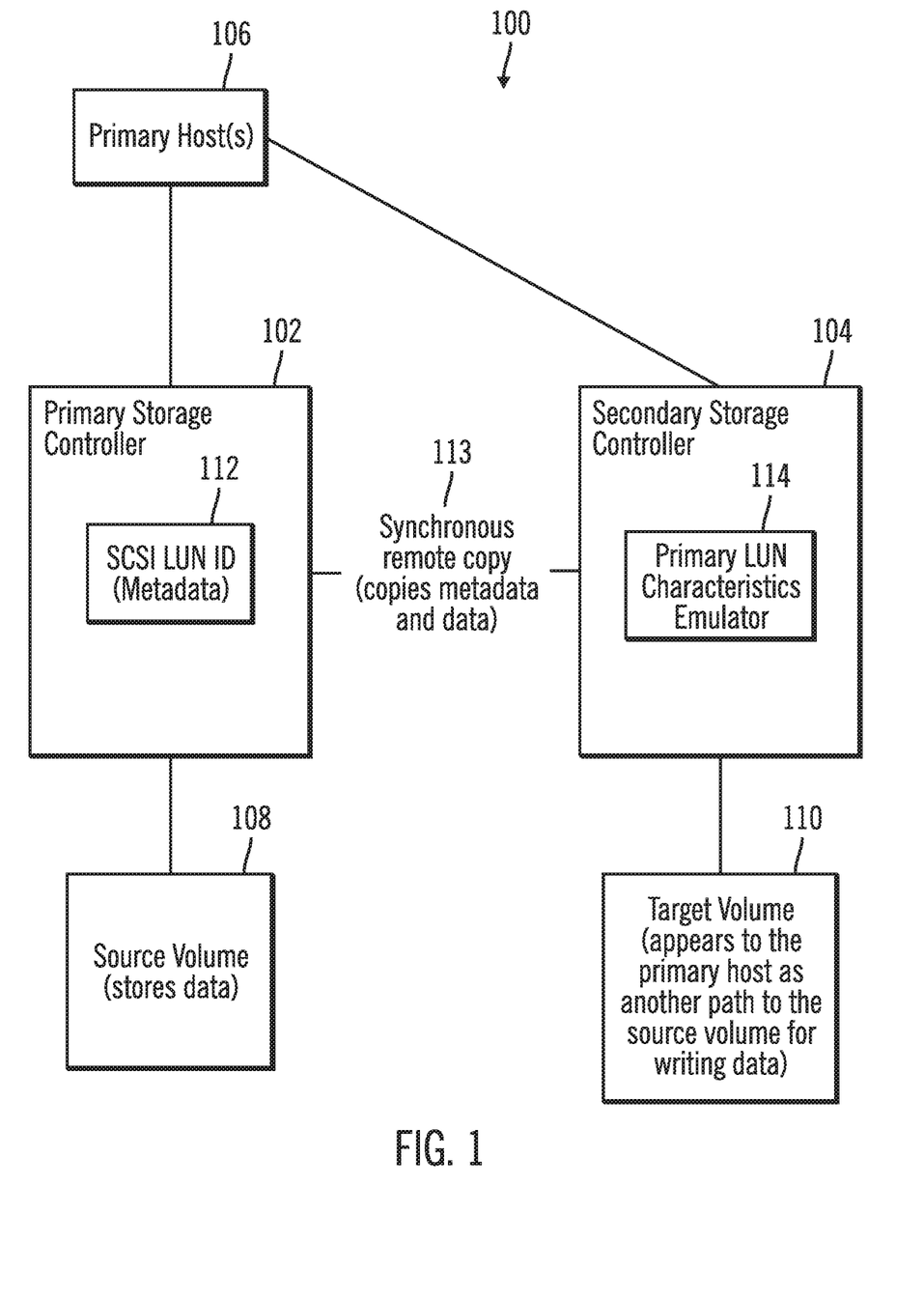
FIG. 1 illustrates a block diagram of a computing environment that includes a primary storage controller coupled to a secondary storage controller, in accordance with certain embodiments.

FIG. 1 illustrates a block diagram of a computing environment 100 that includes a primary storage controller 102 coupled to secondary storage controller 104, in accordance with certain embodiments. One or more primary hosts 106 may also have paths coupling the primary host 106 to the primary storage controller 102 and the secondary storage controller 104. The primary storage controller 102, the secondary storage controller 104, and the primary hosts 106 may each be any suitable computational device including those presently known in the art, such as, a personal computer, a workstation, a server, a mainframe, a hand held computer, a palm top computer, a telephony device, a network appliance, a blade computer, a storage server, a storage controller, etc.

The primary storage controller 102 may control one or more source volumes 108, and the secondary storage controller 104 may control one or more target volumes 110. The source volume 108 and the target volume 110 are logical representations of storage volumes stored on storage elements, such as magnetic disks, optical disks, solid state disks, etc.

The coupling of the primary storage controller 102, the secondary storage controller 104, and the primary host 106 may be via a network, wherein the network may be any network known in the art, such as the Internet, an intranet, a Local area network (LAN), a Storage area network (SAN), a Wide area network (WAN), a wireless network, etc. Also the network may be part of one or more larger networks or may be an independent network or may be comprised of multiple interconnected networks. In certain embodiments, the primary storage controller 102, the secondary storage controller 104, the primary host 106, the source volume 108, and the target volume 110 of FIG. 1 may be cloud component parts included in a cloud computing environment.

The primary storage 102 stores metadata 112 corresponding to each of the source volumes 108. The metadata 112 may comprise a Small Computer Systems Interface (SCSI) logical unit (LUN) identifier (ID), also referred to as SCSI LUN ID 112. A source volume may be uniquely identified via a SCSI LUN ID.

Synchronous remote copy operations 113 may copy the SCSI LUN ID 112 from the primary storage controller 102 to the secondary storage controller 104 while performing a synchronous copy of the source volume 108 to the target volume 110. Thus, while performing synchronous copy operation of data not only is the data stored in the source volume 108 of the primary storage controller copied to the target volume 110 of the secondary storage controller, but also the SCSI LUN ID 112 that uniquely identifies the source volume 108 is copied to the secondary storage controller 104.

In certain embodiments, the target volume 110 appears to the primary host 106 as another path to the source volume 108 for writing data. A primary LUN characteristics emulator 114 that executes in the secondary storage controller 104 may use the SCSI LUN ID 112 received from the primary storage controller 102 to map a command to write selected data to the source volume 108 received at the secondary storage controller 104, to write the selected data to the target volume 110.

Figure 2:
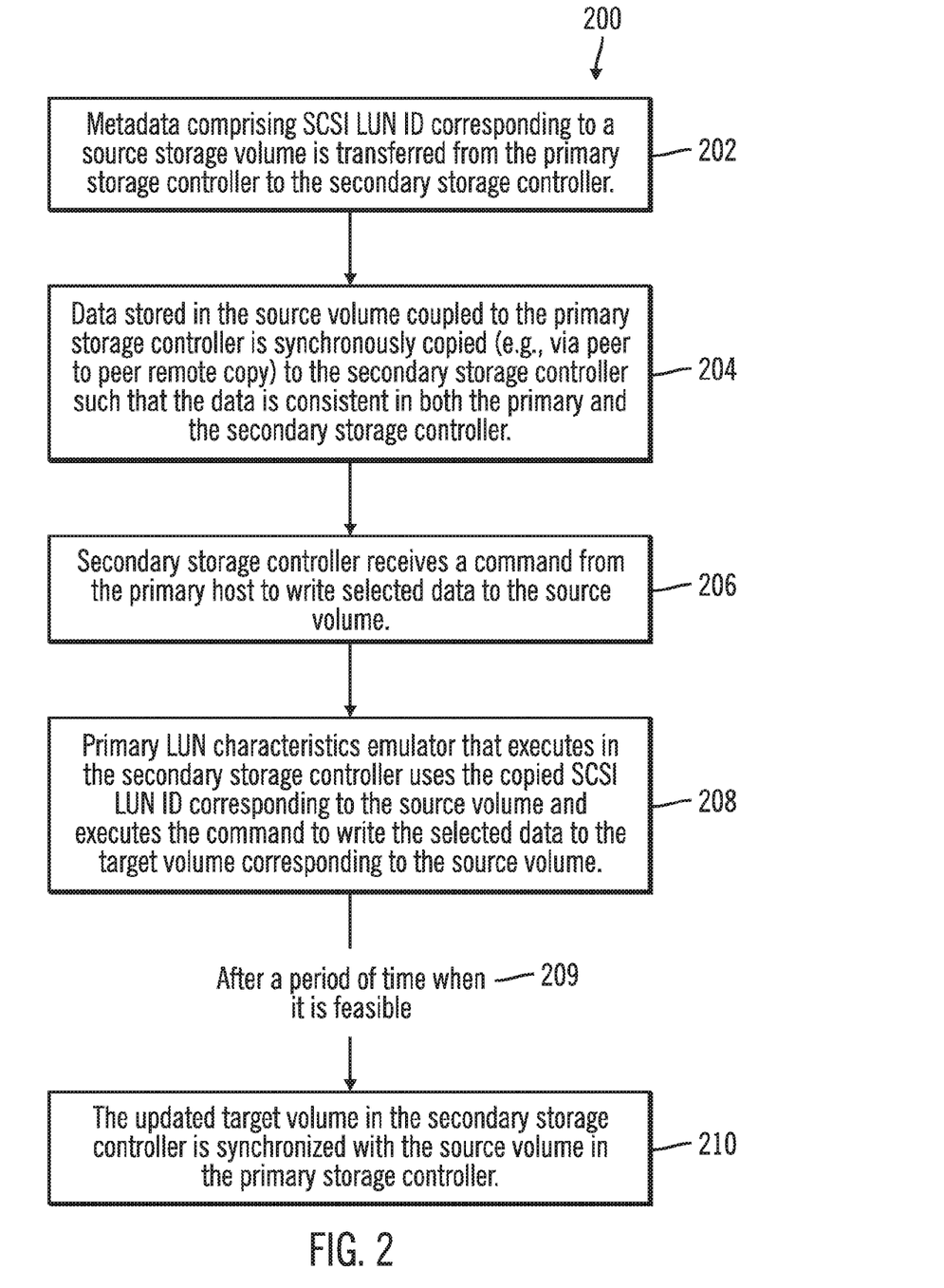
FIG. 2 illustrates a flowchart that shows first operations performed by the primary and secondary storage controllers, in accordance with certain embodiments.

FIG. 2 illustrates a flowchart that shows first operations 200 performed by the primary and secondary storage controllers 102, 104, in accordance with certain embodiments.

Control starts at block 202 in which metadata 112 comprising SCSI LUN ID 112 corresponding to a source storage volume 108 is transferred from the primary storage controller 102 to the secondary storage controller 104. Control proceeds to block 204, in which data stored in the source volume 108 coupled to the primary storage controller 102 is synchronously copied (e.g., via peer to peer remote copy) to the target volume 110 of the secondary storage controller 104 such that the data is consistent in both the primary storage controller 102 and the secondary storage controller 104 with respect to each other.

The secondary storage controller 104 receives (at block 206) a command from the primary host 106 to write selected data to the source volume 108. The command from the primary host 106 may identify the source volume 108 via the corresponding SCSI LUN ID. The primary LUN characteristics emulator 114 that executes in the secondary storage controller 104 uses the copied SCSI LUN ID corresponding to the source volume 108 to determine that the command received from the primary host 106 is for the source volume 108 and executes (at block 208) the command to write the selected data to the target volume 110 corresponding to the source volume 108. Therefore, instead of writing to the source volume 108 as requested by the primary host 106, the secondary storage controller 104 writes to the target volume 110. In certain embodiments, the command from the primary host 108 is interpreted by the secondary storage controller 108 as a write operation to the source volume 108 identified by the SCSI LUN ID 112 that was received earlier (at block 202) by the secondary storage controller. The primary LUN characteristics emulator 114 uses the SCSI LAN ID corresponding to the source volume 108 to determine the target volume 110.

After a period of time when it is feasible (reference numeral 209), the updated target volume 110 in the secondary storage controller 104 is synchronized with the source volume 108 in the primary storage controller 102.

Therefore, FIG. 2 illustrates certain embodiments in which the secondary storage controller 104 can respond to a write request to a source volume 108 from the primary 106 to write to the target volume 110 corresponding to the source volume 108, and at a later point in time synchronize the target volume 110 to the source volume 108.

Figure 3:
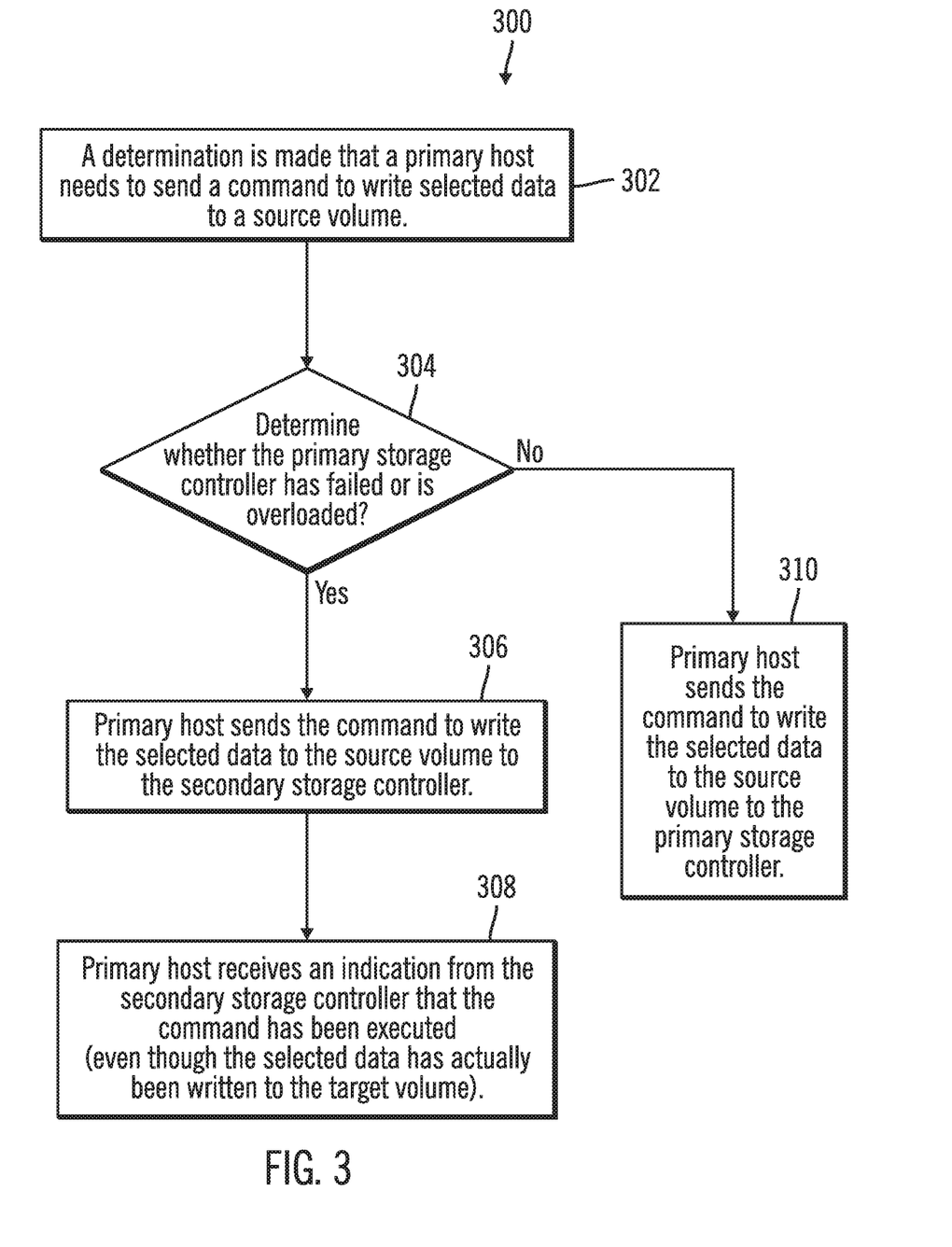
FIG. 3 illustrates a flowchart that shows second operations performed by primary host, in accordance with certain embodiments.

FIG. 3 illustrates a flowchart that shows second operations 300 performed by primary host 106, in accordance with certain embodiments.

Control starts at block 302 in which a determination is made that a primary host 102 needs to send a command to write selected data to a source volume 108. In certain embodiments, the primary host 102 may determine (at block 304) whether the primary storage controller 102 has failed or is overloaded. If the primary storage controller 102 is failed or overloaded ("Yes" branch from block 304) the primary host 106 sends (at block 306) the command to write the selected data to the source volume 108 to the secondary storage controller 104. Control proceeds to block 308 in which the primary host 106 receives an indication from the secondary storage controller 104 that the command has been executed even though the selected data has actually been written to the target volume 110.

If at block 304 it is determined that the primary storage controller 102 has neither failed nor is overloaded ("No" branch from block 304) the primary host 106 sends the command to write the selected data to the source volume 108 to the primary storage controller 102.

In alternative embodiments, the primary host 106 may send the command to write to the source volume 108 under different conditions than those described in block 304 of FIG. 3. In other embodiments, the primary host 106 may broadcast the write request to the source volume 108, to a plurality of storage controllers including the primary storage controller 102 and the secondary storage controller 104.

Therefore, FIG. 3 illustrates certain embodiments in which the primary host 106 may send write requests to be executed on the source volume 108 and have such write requests be executed even if the request is sent to the secondary storage controller 104 instead of being sent to the primary storage controller 102.

Figure 4:
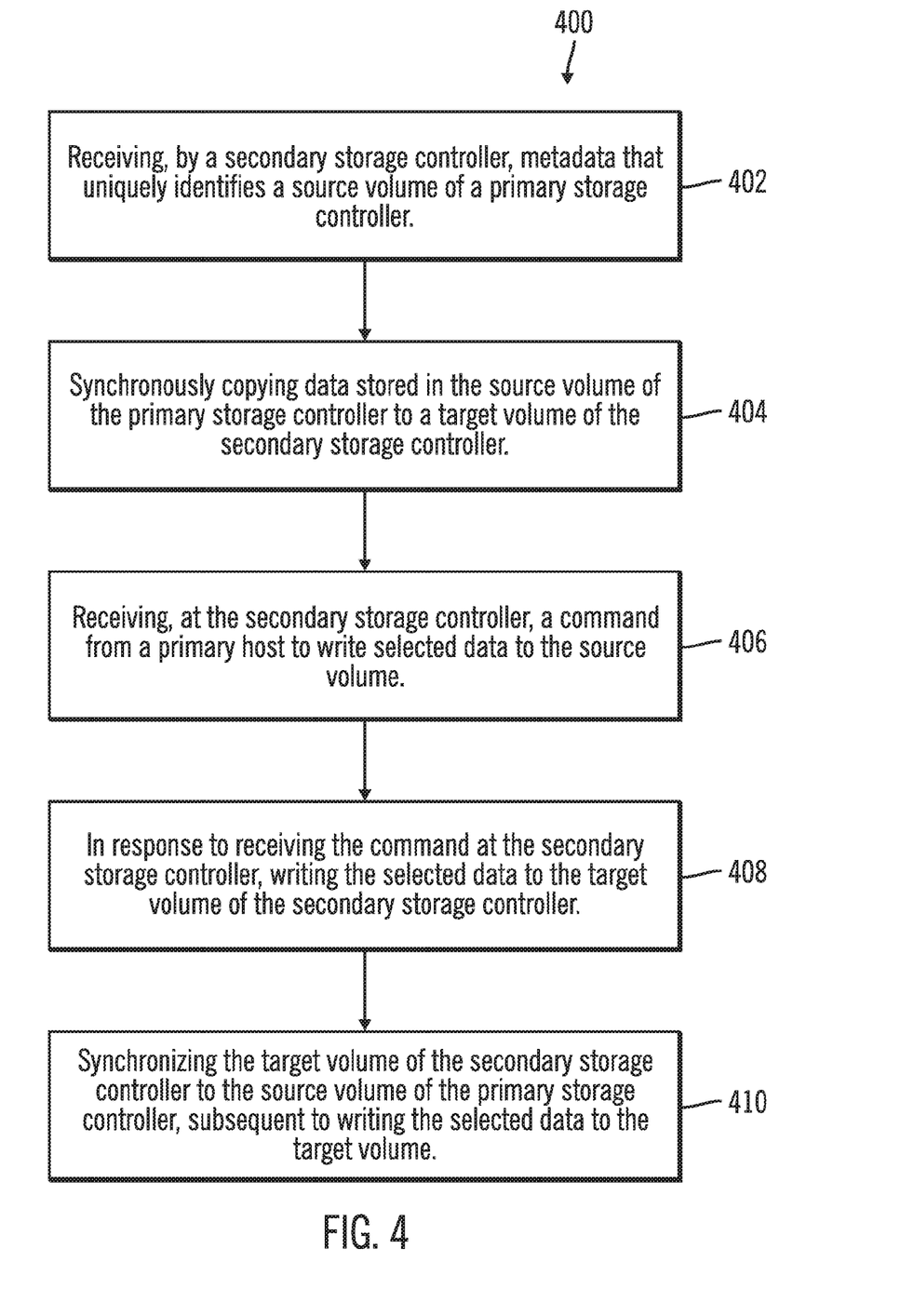
FIG. 4 illustrates a flowchart that shows third operations performed by the secondary storage controller, in accordance with certain embodiments.

FIG. 4 illustrates a flowchart that shows third operations 400 performed by the secondary storage controller 104, in accordance with certain embodiments.

Control starts at block 402, in which a secondary storage controller 104 receives metadata 112 that uniquely identifies a source volume 108 of a primary storage controller 102. Data stored in the source volume 108 of the primary storage controller 102 is synchronously copied (at block 404) to a target volume 110 of the secondary storage controller 104.

The secondary storage controller 104 receives (at block 406) a command from a primary host 106 to write selected data to the source volume 108. In response to receiving the command at the secondary storage controller 104, the selected data is written (at block 408) to the target volume 110 of the secondary storage controller 104. The target volume 110 of the secondary storage controller 104 is synchronized (at block 410) to the source volume 108 of the primary storage controller 102, subsequent to writing the selected data to the target volume 110.

Therefore FIGS. 1-4 illustrate certain embodiments, in which if a primary storage controller 102 fails while performing a write input/output (I/O) operation, then a primary host 106 may use previously installed multi-pathing software to failover to a secondary path, such as the secondary path from the primary host 106 to the secondary storage controller 104. There may not be any need to install any additional host software on the primary host 106.

ADDITIONAL EMBODIMENT DETAILS

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
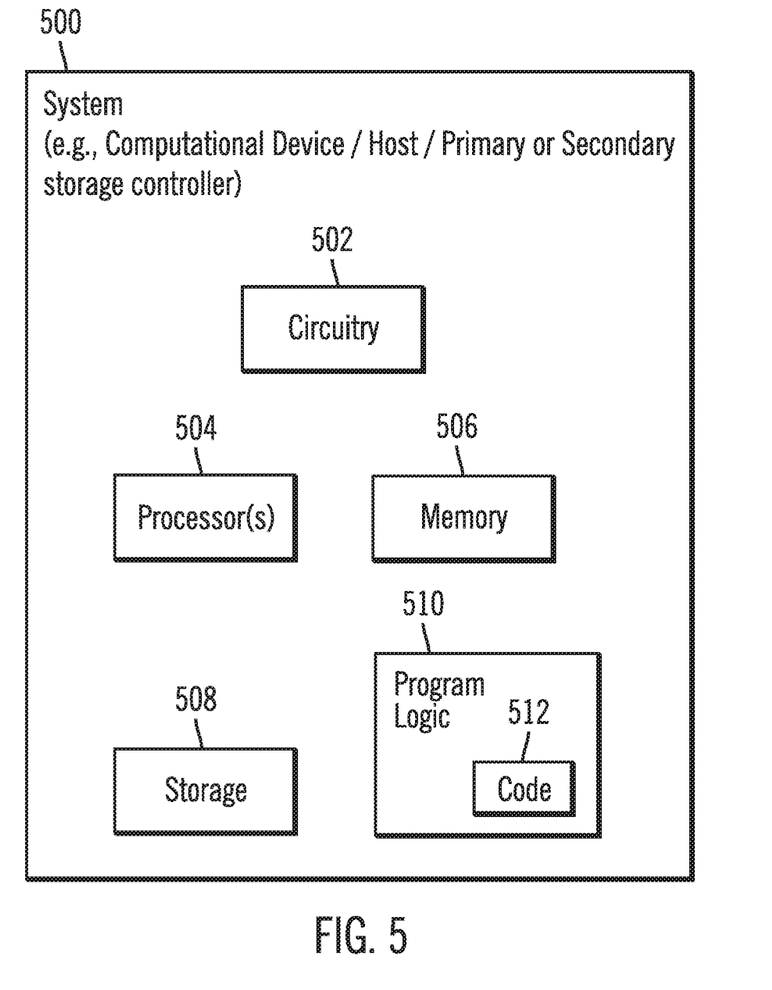
FIG. 5 illustrates a block diagram of a computational system that shows certain elements that may be included in the computing environment of FIG. 1, in accordance with certain embodiments.

FIG. 5 illustrates a block diagram that shows certain elements that may be included in the system 500 in accordance with certain embodiments. The system 500 may comprise the primary storage controller 102, the secondary storage controller 104 or the primary host 106, and may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

In certain embodiments, primary storage controller 102, the secondary storage controller 104, the primary host 108, and the source and target volumes 108,110 of FIG. 1 may be cloud component parts included in a cloud computing environment. In the cloud computing environment the systems architecture of the hardware and software components involved in the delivery of cloud computing may involve a plurality of cloud components communicating with each other. For example, in certain embodiments, the primary and secondary storage controller 102, 104 of FIG. 1 may provide clients, and other servers and software and/or hardware components in the networked cloud with storage and data processing services.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving, by a secondary storage controller, an identifier that uniquely identifies a source volume controlled by a primary storage controller;
   copying data stored in the source volume controlled by the primary storage controller to a target volume controlled by the secondary storage controller;
   receiving, at the secondary storage controller, a command from a primary host to write data associated with the command, to the source volume, wherein the primary host is coupled to the primary storage controller and the secondary storage controller; and
   in response to receiving the command at the secondary storage controller from the primary host to write the data associated with the command to the source volume controlled by the primary storage controller, using the identifier that uniquely identifies the source volume controlled by the primary storage controller and was previously received by the secondary storage controller, to write the data associated with the command to the target volume controlled by the secondary storage controller.

2. The method of claim 1, further comprising:
synchronizing the target volume controlled by the secondary storage controller to the source volume controlled by the primary storage controller, subsequent to writing the data associated with the command to the target volume.

3. The method of claim 1, wherein:
the primary host is coupled to the primary storage controller and a path exists from the primary host to the secondary storage controller.

4. The method of claim 1, wherein:
in response to the primary storage controller being overloaded, sending, by the primary host, the command to write the data associated with the command to the source volume controlled by the primary storage controller to the secondary storage controller that controls the target volume.

5. The method of claim 1, further comprising:
receiving, by the primary host, an indication from the secondary storage controller that the command to write the data associated with the command to the source volume has been executed, even though the data associated with the command has been written to the target volume.

6. A system, comprising:
a memory; and
a processor coupled to the memory, wherein the processor performs operations, the operations comprising:
receiving, by a secondary storage controller, an identifier that uniquely identifies a source volume controlled by a primary storage controller;
copying data stored in the source volume controlled by the primary storage controller to a target volume controlled by the secondary storage controller;
receiving, at the secondary storage controller, a command from a primary host to write data associated with the command, to the source volume, wherein the primary host is coupled to the primary storage controller and the secondary storage controller; and
in response to receiving the command at the secondary storage controller from the primary host to write the data associated with the command to the source volume controlled by the primary storage controller, using the identifier that uniquely identifies the source volume controlled by the primary storage controller and was previously received by the secondary storage controller, to write the data associated with the command to the target volume controlled by the secondary storage controller.

7. The system of claim 6, the operations further comprising:
synchronizing the target volume controlled by the secondary storage controller to the source volume controlled by the primary storage controller, subsequent to writing the data associated with the command to the target volume.

8. The system of claim 6, wherein:
the primary host is coupled to the primary storage controller and a path exists from the primary host to the secondary storage controller.

9. The system of claim 6, wherein:
in response to the primary storage controller being overloaded, sending, by the primary host, the command to write the data associated with the command to the source volume controlled by the primary storage controller to the secondary storage controller that controls the target volume.

10. The system of claim 6, the operations further comprising: receiving, by the primary host, an indication from the secondary storage controller that the command to write the data associated with the command to the source volume has been executed, even though the data associated with the command has been written to the target volume.

11. A computer program product, the computer program product comprising:
a non-transitory computer readable storage medium having computer readable program code embodied therewith, the computer readable program code configured to perform operations, the operations comprising:
receiving, by a secondary storage controller, an identifier that uniquely identifies a source volume controlled by a primary storage controller;
copying data stored in the source volume controlled by the primary storage controller to a target volume controlled by the secondary storage controller;
receiving, at the secondary storage controller, a command from a primary host to write data associated with the command, to the source volume, wherein the primary host is coupled to the primary storage controller and the secondary storage controller; and
in response to receiving the command at the secondary storage controller from the primary host to write the data associated with the command to the source volume controlled by the primary storage controller, using the identifier that uniquely identifies the source volume controlled by the primary storage controller and was previously received by the secondary storage controller, to write the data associated with the command to the target volume controlled by the secondary storage controller.

12. The computer program product of claim 11, the operations further comprising:
synchronizing the target volume controlled by the secondary storage controller to the source volume controlled by the primary storage controller, subsequent to writing the data associated with the command to the target volume.

13. The computer program product of claim 11, wherein:
the primary host is coupled to the primary storage controller and a path exists from the primary host to the secondary storage controller.

14. The computer program product of claim 11, wherein:
in response to the primary storage controller being overloaded, sending, by the primary host, the command to write the data associated with the command to the source volume controlled by the primary storage controller to the secondary storage controller that controls the target volume.

15. The computer program product of claim 11, the operations further comprising:
receiving, by the primary host, an indication from the secondary storage controller that the command to write the data associated with the command to the source volume has been executed, even though the data associated with the command has been written to the target volume.

* * * * *